(12) United States Patent  (10) Patent No.: US 7,964,300 B2
Nakazawa et al.  (45) Date of Patent: Jun. 21, 2011

(54) BATTERY PACK

(75) Inventors: Hiroshi Nakazawa, Tokyo (JP); Katsuhiko Nakane, Tokyo (JP)

(73) Assignee: TDK-Lambda Corporation, Tokyo (JP)

( * ) Notice: Subject to any disclaimer, the term of this patent is extended or adjusted under 35 U.S.C. 154(b) by 963 days.

(21) Appl. No.: 11/817,547

(22) PCT Filed: Aug. 25, 2006

(86) PCT No.: PCT/JP2006/316757
§ 371 (c)(1),
(2), (4) Date: Aug. 31, 2007

(87) PCT Pub. No.: WO2007/039999
PCT Pub. Date: Apr. 12, 2007

(65) Prior Publication Data
US 2009/0220851 A1    Sep. 3, 2009

(30) Foreign Application Priority Data
Sep. 30, 2005 (JP) .................... 2005-286999

(51) Int. Cl.
*H01M 10/34* (2006.01)
(52) U.S. Cl. ............ 429/58; 429/53; 429/57; 429/59; 429/61; 429/64; 429/82; 429/86

(58) Field of Classification Search ............ 429/53, 429/57, 58, 59, 61, 64, 82, 86
See application file for complete search history.

(56) References Cited

U.S. PATENT DOCUMENTS

| 4,546,056 A * | 10/1985 | Jessen et al. ............... 429/149 |
| 5,843,593 A * | 12/1998 | Fritts et al. ................. 429/84 |
| 6,432,575 B1 * | 8/2002 | Yamagami ................. 429/100 |
| 7,294,432 B2 * | 11/2007 | Howard et al. ............. 429/178 |

FOREIGN PATENT DOCUMENTS

| JP | 07-272704 A | 10/1995 |
| JP | 11-283599 A | 10/1999 |
| JP | 2000-100402 A | 4/2000 |
| JP | 2000-149888 A | 5/2000 |

* cited by examiner

*Primary Examiner* — Patrick Ryan
*Assistant Examiner* — Ben Lewis
(74) *Attorney, Agent, or Firm* — McDermott Will & Emery LLP

(57) ABSTRACT

There is provided a risk-free and easy-to-use battery pack using battery cells 1 as a secondary battery, in which internal gases evaporated by applying overvoltage or the like thereto are processed inside a case to be prevented from leaking to the outside of the case and thereby even if the case has been led to rise in pressure due to a thermorunaway of the battery, the case is free from breaking. To realize this performance, the battery pack 10 is provided with a battery cell housing 17 for housing lithium cells 1 and a gas processor 15 for liquefying the internal gases g generated from the lithium cells 1.

4 Claims, 6 Drawing Sheets

BATTERY PACK

CROSS-REFERENCE TO PRIOR APPLICATIONS

This is a U.S. national phase application under 35 U.S.C. §371 of International Patent Application No. PCT/JP2006/316757, filed Aug. 25, 2006, which claims the benefit of Japanese Application No. 2005-286999, filed Sep. 30, 2005, both of which are incorporated by reference herein. The International Application was published in Japanese on Apr. 12, 2007 as International Publication No. WO 2007/039999 A1 under PCT Article 21(2).

TECHNICAL FIELD

The present invention relates to a battery pack of a chargeable and dischargeable secondary battery such as a lithium-ion battery or the like, which is employed as an electric power supply for various types of electronic devices.

BACKGROUND ART

Heretofore, a lead storage battery has been extensively used as a secondary battery. This is due for example to the fact that a lead storage battery can be manufactured at low cost and is comparatively easy-to-use and so on. The lead storage battery, however, uses lead which is a material hazardous to a human body and further has a low electric power density, thus resulting in a limitation in application. Under the situation like this, recently, a lithium-ion battery which has high electric power density as an electricity storage medium and can be reduced in size is coming into wide use. FIG. 8 represents a structure of a laminate-type lithium-ion battery, as a one exemplary configuration of the lithium-ion battery. A lithium-cell 1, acting as the laminate-type lithium-ion battery, has a structure such that a separator 4 is inserted for insulation between a positive-electrode material 2 such as lithium cobaltate ($LiCoO_2$), lithium manganate ($LiMnO_2$) or the like and a negative-electrode material 3 such as graphite (carbon) or the like. Then, some of thus assembled units are stacked into a laminate structure 5, and thereafter the laminate structure 5, together with an electrolyte, is sealed with aluminum laminates 6 from upper and lower sides thereof. The positive-electrode material 2 and the negative-electrode material 3 are formed with a positive electrode 2a and a negative electrode 3a, respectively, and both the electrodes protrude outward from the bonded portions of the aluminum laminates 6. In the meantime, a protruding form, figure and material of the electrodes, an entire size of the laminate-type battery or the like are not specifically limited, permitting various types thereof.

Despite high electric power density as an electricity storage medium, the lithium-cell 1 with the structure like this uses a material which generates a flammable gas at high temperature and hence involves the risk of inducing smoking and kindling if abnormal state such as overcharge or the like occurs in the battery. Flammable internal gases generated inside the lithium-cells 1 include evaporating gases (diethyl carbonate and ethylene carbonate gases) generated from the electrolyte due to, e.g., overvoltage and $CH_4$, $C_2H_4$, $C_2H_6$, etc. which are generated from the electrolyte due to thermo-runaway. Consequently, when the lithium-cells 1 are at high temperature, these gases are generated inside the battery to induce expansions of the aluminum laminates 6. If such condition persists, the aluminum laminates 6 are likely to explode, posing a risk. Then, when the aluminum laminates 6 have been broken, the electrolyte outflows, and when at high temperature, it evaporates to generate visible smoke. Further, if the abnormal state such as overcharging or the like continues, the separator 4 inside the lithium cells 1 melts to cause internal short-circuiting between the positive and negative electrodes 2a, 3a, thus posing risk of giving rise to kindling at once. Accordingly, in order to avert the above-mentioned situations, the lithium-cell 1 has a safety valve 7 provided at an opposite end of a position where the positive and negative electrodes 2a, 3a are provided. Specifically, when internal pressure of the lithium-cells 1 has become equal to or higher than a given pressure, a minimal-length path 7b leading to a valve opening 7a provided in a thermally bonded portion of the aluminum laminates 6 is opened to discharge the internal gases from the valve opening 7a to the outside of the lithium-cells 1.

FIG. 9 represents a battery stack 8 built up by stacking the lithium-cells 1 as a battery cell. The battery stack 8 is housed in a resinous or metallic case (not shown) designed in view of necessary electric energy as a battery pack. Accordingly, if the abnormal state such as overcharge or the like has occurred in the battery stack 8, the internal gases evaporated from the lithium-cells 1 are discharged and as a result fill an inside of the case of the battery pack. Then, a pressure rise inside the case causes outward leakage of the internal gases. At the same time, if the case is formed with an air-tight structure to prevent the gas leakage, internal pressure of the case rises, resulting in a risk for the case to be broken in the worst-case scenario.

In view of the above-mentioned, one scheme has ever been proposed (for example in patent document 1) in which an explosion-proof valve is provided in a case itself of the lithium-ion battery and when pressure inside the battery has risen to a given pressure or above, internal gases inside the battery are discharged to the outside of the battery through the explosion-proof valve to perform gas venting, thus preventing the gases from exploding.

Patent document 1: Japanese unexamined patent application publication No. 11-283599

DISCLOSURE OF THE INVENTION

Problems to be Solved by the Invention

If the explosion-proof valve, however, is provided in the battery pack to discharge the internal gases evaporated directly to the outside of the case of the battery pack, a negative effect is exerted on the surrounding environment. Accordingly, some sort of a gas processing is separately required. At the same time, as previously noted, if the case is constituted with an air-tight structure to prevent the gases from leaking, the internal pressure of the case rises, resulting in a risk of the case being broken in the worst-case scenario.

Consequently, with the view to the forgoing problems, it is an object of the present invention to provide a battery pack which is risk-free and is easy-to-use, such that in a battery pack using battery cells, internal gases evaporated due to an application of overvoltage or the like are processed inside a case of the battery pack to prevent the internal gases from leaking to the outside of the case and besides even when internal pressure of the case has risen due to a thermorunaway of the battery pack, the case is free from breaking.

The present invention is a battery pack including a battery cell housing which houses battery cells and a gas processor which liquefies gases generated from the battery cell.

Further, the present invention is a battery pack in which the gas processor is composed of a metallic body having a plurality of spaces partitioned by partition walls.

Furthermore, the present invention is a battery pack in which a gas inflow port is provided in one space of the metallic body and a gas exhaust port is provided in another space of the metallic body and further a ventilation hole is provided in the partition walls.

Moreover, the present invention is a battery pack in which the gas inflow port is located at a position lower than where said ventilation hole is located Besides, the present invention is a battery pack in which the gas processor is composed of the metallic body with gas flow paths partitioned by the partition walls.

Further, the present invention is a battery pack in which the partition walls protrude alternately from opposite inner walls and besides basal portions of the partition walls are provided so as to be aslope toward a downstream side of gases.

Furthermore, the present invention is a battery pack in which a thermal insulating material is arranged between the gas processor and the case of the battery pack.

Moreover, the present invention is a battery pack in which an absorbent material is arranged in a gas exhaust vicinity of the battery stack.

EFFECT OF THE INVENTION

According to the battery pack of the present invention, the internal gases generated from the battery cells can be liquefied inside the battery pack. Hence, there is no need to separately take measures for gas processing. Accordingly, the risk-free and easy-to-use battery pack can be realized in which the internal gases evaporated due to an application of overvoltage or the like are processed inside a case of the battery pack to prevent the gases from leaking to the outside of the case and besides the case is free from breaking even if internal pressure of the case has increased due to a thermo-runaway of the battery pack.

Further, according to the battery pack of the present invention, the gas processor is composed of the metallic body having the plurality of the spaces partitioned by the partition walls. Hence, the internal gases can be efficiently liquefied.

Furthermore, according to the battery pack of the present invention, the internal gases which have inflowed into the gas processor can be sequentially liquefied in the plurality of the spaces partitioned by the partition walls. Hence, the internal gases can be further efficiently liquefied.

Moreover, according to the battery pack of the present invention, the gas inflow port is located at the position lower than that where the ventilation hole is located. Hence, liquefied gases can be prevented from remaining in the spaces of the metallic body provided with the gas inflow port. Hence, a mounting posture of the battery pack is increased in degree of freedom.

Further, according to the battery pack of the present invention, a path from a gas discharging portion of the battery cell to the gas exhaust port is elongated. Hence, liquefaction of the gases can be accomplished while the gases are flowing in the path.

Furthermore, according to the battery pack of the present invention, the gases are allowed to be easy to remain within the spaces sandwiched by the partition walls, so that the gases can be efficiently liquefied and besides the gases liquefied are easy to remain within the spaces.

Moreover, according to the battery pack of the present invention, the thermal insulating material is arranged between the gas processor and the case of the battery pack. Hence, thermal conduction from the case to the metallic body, acting as a gas processor, can be blocked off. Hence, a temperature rise of the metallic body can be restrained to enable the internal gases to be efficiently liquefied.

Furthermore, according to the battery pack of the present invention, the liquid absorbent material is arranged in the gas exhaust vicinity of the battery stack. Hence, even if an electrolyte has outflowed from the battery stack, the electrolyte which has outflowed can be absorbed by the liquid absorbent material. Consequently, the electrolyte can be prevented from leaking to the outside of the case of the battery pack.

BEST MODE FOR CARRYING OUT THE INVENTION

Next is a detailed description of preferred embodiments of a battery pack according to the present invention with reference to the appended drawings, in which the same reference symbols are used for parts the same as in the conventional example and descriptions for common parts are omitted to avoid duplicate description as much as possible.

Embodiment 1

FIG. 1 is a block diagram representing a battery pack 10 using a lithium cell 1 acting as a battery cell of a chargeable and dischargeable secondary battery and an outline configuration in using the battery pack 10. In the figure, a battery pack 10 is incorporated with lithium cells 1 together with a protection circuit 11. The protection circuit 11 is equipped with, e.g., a current fuse, a temperature fuse, an overvoltage protector or the like to cut off charging electric power fed to the lithium cells 1 in occurrences of overcurrent, overvoltage and abnormal temperature. Obviously, differing from the figure, it is possible to provide the protection circuit 11 and the battery pack 10 separately from each other.

A battery charger 12 that feeds charging electric power to the lithium cells 1 is connected with a previous stage of the battery pack 10. The battery charger 12 comprises a stabilized power supply 13 that produces stabilized charging electric power and a charging circuit 14 that charges the lithium cells 1 using the stabilized charging electric power. The charging circuit 14 comprises constant-voltage and constant-current circuits for making a charging voltage or a charging current constant to charge linearly the lithium cells 1, a pulse charging circuit that feeds pulse-shaped charging currents to charge the lithium cell 1 by these pulse currents, and so on. These are determined accordingly by performance and a life span of a battery.

FIG. 2 is a perspective view representing an internal structure of the battery pack 10. FIG. 3 is a plain cross-sectional view of the battery pack 10 and further FIG. 4 is a cross-sectional view on arrow line A-A in FIG. 3. Furthermore, FIG. 5 is an exploded perspective view representing main members of a gas processor 15.

The battery pack 10 includes a battery cell housing 17 that houses the lithium cells 1 inside a case 16 of the battery pack, that forms an enclosure of the battery pack 10, and the gas processors 15 that liquefies gases generated from the lithium cells 1. The battery cell housing 17 houses a battery stack 8 built up by stacking the required number of the lithium cells 1 electrically connected with one another. In the present embodiment, six lithium cells 1 for building up the battery pack 10 whose rating voltage is 24V are stacked to make up the battery stack 8. When the protection circuit 11 is involved in the specification, a printed-circuit board (not shown), together with the battery stack 8 built up by stacking the lithium cells 1, that is mounted with circuit parts of the protection circuit 11 is housed in the battery cell housing 17, too.

The battery stack 8 has a structure built up by stacking the lithium cells 1 one above the other. Excellent-exoergic interlayer member 21 such as an aluminum plate or the like may be interposed between each of the lithium cells 1. The battery stack 8 has such a tendency that heat is prone to remain in a central portion thereof and thereby the lithium cells 1 located there are prone to become higher in temperature than the other lithium cells 1. By providing the excellent-exoergic interlayer member 21 between each lithium cell 1, heat of each lithium cell is rapidly dissipated. Hence, the heat doesn't remain in the central portion of the battery stack 8 and thereby the lithium cells 1 can be restrained from rising in temperature.

In addition, positive and negative electrodes 2a, 3a of the battery stack 8 built up by stacking the lithium cells 1one above the other are connected to each other by a connecting cable 23 and are also connected electrically with the protection circuit 11.

The lithium cells 1 in the present embodiment are provided with a safety valve 7 at an end of an opposite side of a position where the positive and negative electrodes 2a, 3a are provided. The gas processor 15 is provided behind the safety valve 7, i.e., adjacently to the opposite side of the position where the positive and negative electrodes 2a, 3a are provided. The gas processor 15 is provided to introduce and process flammable substances that are contained in internal gases, that is contained substances discharged from the safety valve 7 in overcharge or the like of the lithium cells 1 or the like, i.e., evaporated gases of an electrolyte leading directly to smoking and kindling, and are contained in a volatile organic gas.

The gas processor 15 is formed by making a metallic material such as aluminum or the like, that is excellent in thermal conductivity and in exoergic property, into a boxy shape. The battery cell housing 17 and the gas processor 15 are each defined as a separate space from each other and communicate with each other through the gas inflow port 25. Further, the gas processor 15 is partitioned into several spaces 27a to 27f by partition walls 26, which are each provided with a ventilation hole 28 for making the adjacent spaces among the spaces 27a to 27f communicate with each other. In this case, it is preferable that the gas inflow port 25 be arranged at a position lower than that where the ventilation hole 28 provided in the partition wall is located. Due to this arrangement, liquefied gases can be prevented from remaining within the spaces of the gas processor 15, thus increasing a degree of freedom in a mounting posture of the battery pack 10. Further, the ventilation hole 28 should not be too large in order for the internal gases not to pass directly through the spaces 27a to 27f, whereas it should not be too small in order for the case 16 not to be deformed by internal pressure of the case 16 at the time of thermorunaway of the battery pack.

The gas processor 15 is structured separately from the battery cell housing 17. Specifically, as shown in FIGS. 3 to 5, main members of the gas processor 15 comprise a septate boxy member 29 that includes six spaces 27a to 27f in plain view and is made from an aluminum extrusion material, and lower and upper covers 31, 32 that close openings of both ends of the sepatate boxy member 29. The septate boxy member 29 is partitioned by the partition walls 26 into the six spaces 27a to 27f. The ventilation hole 28 that makes adjacent spaces among the spaces 27a to 27f communicate with each other is provided in each partition wall 26. Further, in sidewalls of the spaces 27a, 27f located at both the ends of the septate boxy member 29, there are provided the gas inflow port 25 acting as an entrance of gases g and a gas exhaust port 33 acting as an exit of the gases g. The lower and upper covers 31, 32 is each made from a flat plate with dimensions matched to a size of an opening of the septate boxy member 29 and are mounted on the openings of both the ends of the septate boxy member 29 by being fastened thereto using tight bolts 34 and nuts 35 in order to close the openings of both the ends of the septate boxy member 29. Further, when mounting the lower and upper covers 31, 32, for securing airtightness of each of the spaces 27a to 27f, a liquid sealant is applied to mating surfaces between the ends of the septate boxy member 29 and each of the covers 31, 32 and to contact portions between each of the covers 31, 32 and the tight bolts 34 the nuts 35. In addition, gasket may be employed instead of the liquid sealant to ensure airtightness of the mating faces and contact portions.

In order to improve gas liquefying capability in the gas processor 15, a material, thickness and form of the septate boxy member 29 and lower and upper covers 31, 32, and the number of partition walls should be accordingly determined by experiments or the like. Further, positions of the ventilation holes 28 provided in the partition walls 26 may be different in each partition wall so that a gas flow path length is elongated. Furthermore, a metallic-scrubber-like filler may fill inside each of the spaces 27a to 27f to improve the gas liquefying capability.

The gas inflow port 25 is arranged over against the battery cell housing 17. Specifically, the gas inflow port 25 is arranged close to a gas exhaust vicinity 30 of the battery pack 8, while a liquid absorbent material 36 is arranged in the gas exhaust vicinity 30. As a result, even if the electrolyte has outflowed from the battery stack 8, the liquid absorbent material 36 can absorb the electrolyte that has outflowed. Accordingly, the electrolyte can be prevented from leaking to the outside of the case 16 of the battery pack 10. The liquid absorbent material 36 comprises a porous body with many communicating holes and has thermal resistance that enables its application at about 150 deg C. As a porous inflammable material body like this, e.g., Basotect (manufactured by NOIAC Corp.) can be cited. The gas exhaust port 33 is arranged to be air-tight with an inner surface of the case 26 acting as an enclosure and thereby smoke can be exhausted that is generated when the internal gases cannot be sufficiently liquefied due to the thermorunaway of the battery pack.

A thermal insulating material 37 is arranged between the gas processor 15 made of metal and the case 16 of the battery pack. A surface temperature of the lithium cell 1 reaches about 90 to about 110 deg C. when the safety valve 7 of the lithium cell 1 operates due to the application of overvoltage to exhaust the internal gases. As a result, the case 16 of the battery pack, which houses the battery stack 8, rises in temperature by heat transmission from the battery stack 8. Accordingly, if the gas processor 15 contacts directly with the case 16, the gas processor 15 also rises in temperature by heat transmission from the case 16, so that the gas liquefying capability of the gas processor decreases. Therefore, in order to avert the adverse effect like this, the thermal insulating material 37 is arranged between the gas processor 15 and the case 16 of the battery pack.

Next is a description of behavior at the time of overvoltage and overcharge that are applied to the battery pack 10.

When an overvoltage has been applied from a battery charger 12 to the battery stack 8, decomposition of the electrolyte inside the lithium cell 1 accelerates and heat is generated to allow the lithium cell 1 to start rising in temperature. At the same time, evaporated gases of the electrolyte are generated inside the lithium cell 1 to cause the aluminum laminates 6, 6 to expand. When the temperature rise progresses further to generate the thermal decomposition of the electrolyte, volatile organic internal gases g such as $CH_4$, $C_2H_4$, $C_2H_6$ and the like are generated. At this time, if pressure inside the lithium cell 1 has risen beyond a given value, the internal gases such as the evaporated gases of the electrolyte inside the lithium cell 1 and the volatile organic internal gases g discharge from the safety valve 7. If no safety valve 7 is provided and some troubles such as clogging of the safety valve 7 or the like exists, the seal of the aluminum laminates 6, 6 of the lithium cells 1 breaks to discharge the internal gases g from the broken portion.

When the internal gases g have been discharged from the lithium cell 1, pressure of a space, acting as the battery cell housing 17, starts rising. The battery cell housing 17 and the gas processor 15 communicate with each other through the gas inflow port 25 and besides an inside of the gas processor 15 is under the atmospheric pressure. Hence, the internal gases g discharged inflow from the battery cell housing 17 to the gas processor 15 by the pressure difference therebetween. First, the internal gases g from the battery cell housing 17 inflow to a first chamber 27a acting as the space of the gas processor 15 to come in contact with inner surfaces of the gas processor 15. The gas processor 15 made of metal is formed so as to have comparatively large thermal capacity and therefore is significantly low in temperature as compared to the internal gases g. Hence, when having come in contact with the inner surfaces of the gas processor 15, the internal gases g are subjected to dew condensation to be liquefied, thus becoming liquefied gases 38. Then, when the internal gases g continue to inflow to the first chamber 27a, all the internal gases g cannot be liquefied only by inner surfaces of the first chamber 27a and therefore the internal gases g non-liquefied are forced to inflow to an adjacent second chamber 27b through the ventilation hole 28 provided in the partition wall 26. Then, when having come in contact with inner surfaces of the second chamber 27b, the internal gases g that have inflowed to the second chamber 27b are subjected to dew condensation to be liquefied. If the internal gases g from the lithium cell 1 further continue to be generated, all the internal gases g cannot be liquefied only by the inner surfaces of the first and second chambers 27a, 27b and therefore the internal gases g non-liquefied are forced to inflow to an adjacent third chamber 27c through the ventilation hole 28 provided in the partition wall 26. Then, when having come in contact with inner surfaces of the third chamber 27c, the internal gases g that have inflowed to the third chamber 27c are subjected to dew condensation to be liquefied. Thus, if the internal gases g from the lithium cell 1 continue to be generated, the internal gases g are forced to inflow continuously in such a manner as to inflow from the first chamber 27a to the second chamber 27b and from the second chamber 27b to the third chamber 27c and so on in sequence. The internal gases g that have become in contact with the inner surfaces of each chamber in these processes are subjected to dew condensation to be continuously liquefied. When the internal gases g are generated in high volume to cause part of the internal gases to remain non-liquefied even in having reached the final chamber 27f, the remaining internal gases g get to the gas exhaust port 33 provided in the final chamber 27f to be exhausted outward.

Note that when the high-temperature internal gases g come in contact with the inner surfaces of each chamber to be liquefied, the gases decrease significantly in volume and as a result decrease in pressure, too. That is, when observing the gas pressure inside the battery pack 10, the gas pressure is highest in the battery cell housing 17 and then decreases in the order of the first, second, third . . . final chambers 27a, 27b, 27c . . . 27f of the gas processor 15. Also, the gases decrease in temperature in the same order and therefore concentration of the gases g exhausted from the final chamber 27f to the outside diminishes. As a result, the gas volume in the final chamber 27f is extremely small in comparison with the volume of the gases discharged from the lithium cells 1. Therefore, since the gases generated due to the application of an overvoltage are not large in volume, there is little or no gas g exhausted from the final chamber 27f to the outside. In this way, a risk-free and easy-to-use battery pack 10 can be provided in which the internal gases g evaporated due to the application of overvoltage are processed inside the case 16 of the battery pack 10 to be prevented from leaking outward as much as possible and besides even when a large volume of the gases is generated due to the thermorunaway of the battery pack to cause the internal pressure of the case 16 to continuously rise, the case 16 is not broken. In addition, the internal gases 38 that have remained in the gas processor 15 are extracted to be appropriately processed where necessary.

Embodiment 2

FIG. 6 represents a plain cross-sectional view of a battery pack 10 in a present second embodiment. The battery pack 10 is the same as that in the first embodiment except a structure of a gas processor 15. The battery pack 10, i.e., includes a battery cell housing 17 that houses a battery stack 8 built up by stacking lithium cells 1 one above the other inside a case 16 of the battery pack, that forms an enclosure of the battery pack, and a gas processor 15 that liquefies gases generated from the lithium cells 1. The gas processor 15 in the present second embodiment is one where a path from a safety valve acting as a discharging portion of the lithium cells 1 to an exhaust port is elongated, so that the gases are liquefied by cooling walls while flowing through the path.

The gas processor 15 is formed by making a metallic material such as aluminum or the like, that is excellent in thermal conductivity and in exoergic property, into a boxy shape. The battery cell housing 17 and the gas processor 15 are defined as a separate space from each other and communicate with each other through the gas inflow port 40.

Main members of the gas processor 15 comprise a septate boxy member 42 that is made from an aluminum extrusion material and has a flow path largely meandering in plain view, and upper and lower covers (not shown) that close openings of both ends of the sepatate boxy member 42. Besides, a plurality of the cooling walls 43, 43a corresponding to the partition walls is juxtaposed inside the sepatate boxy member 42 in a manner protruding alternately from the left and right sides (in the longitudinal direction of the sepatate boxy member 42), so that internal spaces partitioned by these cooling walls 43 play a role as a flow path 41. A discontinued portion of the cooling wall 43a that forms one wall of the sepatate boxy member 42 is a gas inflow port 40 acting as an entrance to the flow path 41. Further, a gas exhaust port 33 acting as an exit of the flow path 41 is provided in another wall opposed to the cooling wall 43a in the sepatate boxy member 42. A specification of the gas processor 15 is required to include a material, thickness, an outward form, the number of partitioned chambers, and a form of the flow path 41 so that sufficiently-high-temperature gases can be cooled to be liquefied as evaporated gases pass through the flow path 41 and in the last result, the evaporated gases can be cooled to the extent of being invisible to the outside of the gas processor 15. If the evaporated gases are not sufficiently cooled, the number of the cooling walls 43 may be increased and the flow path 41 may be made into, e.g., a complicated labyrinth or the like to elongate a total length of the flow path 41.

The lower and upper covers are each composed of a flat plate with dimensions matched to a size of an opening of the septate boxy member 42 and are mounted thereon by being fastened thereto using tight bolts 34 (not shown) and nuts 35 (not shown) in order to close the openings of both the ends of the septate boxy member 42. Further, when mounting the lower and upper covers, for securing airtightness of the flow path 41, liquid sealant is applied to mating surfaces between end faces of the septate boxy member 29 and each of the covers and to contact portions between each of the covers and the tight bolts 34 and the nuts 35. According to need, rubber sheets may be inserted into the mating faces. By ensuring airtightness of the flow path 41, the gases inside the gas processor 15 can be prevented from leaking outward to permit the gases to be prevented from looping back in the flow path 41. In addition, gasket may be employed instead of the liquid sealant.

In order to improve gas liquefying capability in the gas processor 15, a material, thickness, form, number of partition walls of the lower and upper covers are required to be accordingly determined by experiments or the like. Besides, a metallic-scrubber-like filler may be filled inside the flow path 41 to improve the gas liquefying capability.

Further, diameters and positions of the gas inflow port 40, flow path 41 and gas exhaust port 33 need to be appropriately designed depending on a gas volume and gas internal pressure. The appropriate gas volume and gas internal pressure differs depending on a type and specification of the cell (battery), a specification of the battery stack 8, strength of the case or the like. At least the diameters, however, should not be too large for the internal gases so as not to pass directly through the gas inflow port 40, the flow path 41 and the gas exhaust port 33, whereas they should not too small for the case 16 so as not to be deformed by the gas internal pressure at the time of a thermorunaway of the battery pack. Particularly, the gas exhaust port 33 is preferably located at a position resulting from consideration of exhaust performance as a device.

The gas inflow port 40 is arranged over against the battery cell housing 17. Specifically, the gas inflow port 40 is arranged in a gas exhaust vicinity 30 of the battery pack 8, while a liquid absorbent material 36 is arranged also in the gas exhaust vicinity 30. As a result, even if the electrolyte has outflowed from the battery stack 8, the liquid absorbent material 36 can absorb the electrolyte that has outflowed. Accordingly, an electrolyte can be prevented from leaking to the outside of the case 16 of the battery pack 10. The gas exhaust port 33 is arranged to be air-tight with an inner surface of the case 26 acting as an enclosure and thereby smoke can be exhausted that is generated when the internal gases cannot be sufficiently liquefied due to the thermorunaway of the battery pack.

A thermal insulating material 37 is arranged between the gas processor 15 and the case 16 of the battery pack. The case 16 has become high in temperature due to an overcharge of the battery pack. Hence, such a structure of the case 16 is preferable that heat of the case 16 is not transmitted to the cooling walls 43, 43a of the gas processor 15 in order to efficiently liquefy high-temperature gases by the cooling walls 43a, 53. As stated above, if the gas processor 15 contacts directly with the case 16, the gas processor 15 rises in temperature by the heat transmission from the case 16, so that the gas liquefying capability of the gas processor decreases. On the contrary, if the gas processor 15 rises in temperature, the gases once liquefied are likely to re-evaporate. Therefore, in order to avert the adverse effect like this, the thermal insulating material 37 is arranged between the gas processor 15 and the case 16 of the battery pack. In addition, in consideration of the fact that the gases that have remained in the flow path 41 are likely to re-evaporate due to their own heat, it is preferable that such a design is performed that the gases 38 liquefied don't remain in the vicinity of the gas exhaust port 33.

In addition, the battery stack 8 and a mechanism are required to be designed so that the evaporated gases exhausted from the safety valve 7 of each lithium cell 1 building up the battery stack 8 collect at the gas inflow port 40 of the gas processor 15. Further, the gas processor 15 is required to be designed in consideration of directions in which the case 16 is mounted (longitudinally-mounted or laterally-mounted).

Next is a description of behavior at the time of overvoltage and overcharge that are applied to the battery pack 10.

When the internal gases g have been discharged from the lithium cell 1, pressure inside a space, acting as the battery cell housing 17, starts rising. The battery cell housing 17 and the gas inflow port 40 communicate with each other through the gas inflow port 40 and besides an inside of the gas processor 15 is under the atmospheric pressure. Hence, the internal gases g discharged inflow from the battery cell housing 17 to the gas processor 15 by the pressure difference therebetween. The internal gases g from the battery cell housing 17 inflow from the gas inflow port 40 to the flow path 41 of the gas processor 15 to first come in contact with the cooling walls 43, 43a that are wall surfaces of the flow path 41. The cooling walls 43, 43a, eventually the gas processor 15 made of metal are formed so as to have comparatively large thermal capacity and therefore are significantly low in temperature as compared to that of the internal gases g. Hence, when having come in contact with the cooling walls 43, 43a, the internal gases g are subjected to dew condensation to be liquefied, thus becoming liquefied gases 38. Then, when the internal gases g continue to inflow to the flow path 41, all the internal gases g cannot be liquefied only by the cooling walls 43, 43a in the vicinity of the gas inflow port 40 and therefore the internal gases g non-liquefied are forced to inflow so as to proceed on and on in the flow path 41 made labyrinthine. The internal gases g that have contacted with each cooling wall 43 inside the flow path 41 in the course of proceeding in the flow path 41 are subjected to dew concentration to be liquefied in sequence. When the internal gases g are generated in high volume to be caused to remain non-liquefied even in having reached a termination of the flow path 41, the internal gases g non-liquefied get to the gas exhaust port 33 that is provided in the termination of the flow path 41 to act as the exit of the flow path 41 and are exhausted outward.

Embodiment 3

FIG. 7 represents a plain cross-sectional view of the battery pack 10 in a present third embodiment. The battery pack 10 is the same as that in the first and second embodiments except a structure of the gas processor 15. The battery pack 10, i.e., includes a battery cell housing 17 that houses a battery stack 8 built up by stacking lithium cells 1 one above the other inside a case 16 of the battery pack, that forms an enclosure of the battery pack, and a gas processor 15 that liquefies gases generated from the lithium cells 1. As in the second embodiment, the gas processor 15 in the present third embodiment is one where a path from a safety valve 7 acting as a discharging portion of the lithium cells 1 to a gas exhaust port of the battery pack is elongated, so that the gases are liquefied by cooling walls while flowing through the path.

The gas processor 15 is formed by making a metallic material such as aluminum or the like, that is excellent in thermal conductivity and in exoergic property, into a boxy shape. The battery cell housing 17 and the gas processor 15 are defined as a separate space from each other and communicate with each other through the gas inflow port 40.

Main members of the gas processor 15 comprise a septate boxy member 42 that includes a meandering flow path 51 in plain view and is made from an aluminum extrusion material, and upper and lower covers (not shown) that close openings of both ends of the sepatate boxy member 52. Besides, a plurality of the cooling walls 53 corresponding to the partition walls is juxtaposed inside the sepatate boxy member 52 in such a manner as to protrude alternately backward and forward (in a short-length direction of the sepatate boxy member 52), so that internal spaces partitioned by these cooling walls in the sepatate boxy member 52 play a role as the flow path 51. The gas processor 15 in the present third embodiment, i.e., has a structure made up by turning, by just 90 degrees, the arrangement of the partition wall 43 of the gas processor 15 in the second embodiment. In addition, the cooling walls 53 in the present third embodiment are each angled by a given amount so that an apical end of the cooling wall slants to the downstream side direction of the gases relatively to the basal portion of the cooling wall. Accordingly, differently from the flow path 41 with the approximately constant width in the second embodiment, the flow path 51 in the present third embodiment is formed so as to make adjacent chambers among first to seventh chambers 51a to 51g, each of which is a space partitioned into an approximate triangle by each cooling wall 53, communicate with each other at a vertex located at an exit side of each chamber. A discontinued portion that is located nearest to a side of the lithium cells 1 and that forms one sidewall of the septate boxy member 52 serves as the gas inflow port 40 acting as an entrance to the flow path 51. Further, a gas exhaust port 33 acting as an exit of the flow path 51 is provided in another wall opposed to the cooling wall 43a in the septate boxy member 52. A specification of the gas processor 15 is required to include a material, thickness, an outward form and the number of partitioned chambers so that sufficiently-high-temperature gases can be cooled to be liquefied as evaporated gases pass through the flow path 51 and in the last result, the evaporated gases can be liquefied to the extent that the gases are invisible to the outside of the gas processor 15. If the evaporated gases are not sufficiently cooled, the number of the cooling walls 43 may be increased to elongate the flow path 51.

The lower and upper covers are each composed of a flat plate with dimensions matched to a size of an opening of the septate boxy member 52 and are mounted thereon by being fastened thereto using tight bolts (not shown) and nuts (not shown) in order to close the openings of both the ends of the septate boxy member 52. Further, when mounting the lower and upper covers, for ensuring airtightness of the flow path 51, liquid sealant is applied to mating surfaces between end faces of the septate boxy member 52 and each of the covers and to contact portions between each of the covers and the tight bolts and the nuts. According to need, rubber sheets may be inserted into the mating faces. By ensuring airtightness of the flow path 51, the gases inside the gas processor 15 can be prevented from leaking outward to permit the gases to be prevented from looping back to each of the chambers 51a to 51g in the flow path 51. In addition, gaskets may be employed instead of the liquid sealant to ensure the airtightness.

The gas inflow port 40 is arranged in such a manner as to face the battery cell housing 17. Specifically, the gas inflow port 40 is arranged in the gas exhaust vicinity 30 of the battery pack 8, while a liquid absorbent material 36 is arranged in the gas exhaust vicinity 30. As a result, even if an electrolyte has outflowed from the battery stack 8, the liquid absorbent material 36 can absorb the electrolyte that has outflowed. Accordingly, the electrolyte can be prevented from leaking to the outside of the case 16 of the battery pack 10. The gas exhaust port 33 is arranged to be air-tight with an inner surface of the case 16 acting as an enclosure and thereby smoke can be exhausted which is generated when the internal gases cannot be sufficiently liquefied due to a thermorunaway of the battery pack.

A thermal insulating material 37 is arranged between the gas processor 15 and the case 16 of the battery pack. The case 16 has reached a high temperature due to overcharge of the battery pack. Hence, such a structure is preferable that heat of the case 16 is not transmitted to the cooling walls 43a, 53 of the gas processor 15 in order to efficiently liquefy high-temperature gases by the cooling walls 43a, 53. As stated above, if the gas processor 15 contacts directly with the case 16, the gas processor 15 rises in temperature by heat transmission from the case 16, so that gas liquefying capability of the gas processor 15 decreases. On the contrary, if the gas processor 15 rises in temperature, the gases once liquefied are likely to re-evaporate. Therefore, in order to avert the adverse effect like this, the thermal insulating material 37 is arranged between the gas processor 15 and the case 16 of the battery pack. In addition, in consideration of the fact that the liquefied gases 38 that have remained in the flow path 51 are likely to re-evaporate by their own heat, it is preferable that such a design be performed that the gases 38 liquefied doesn't remain in the vicinity of the gas exhaust port 33.

In addition, the battery stack 8 and a mechanism are required to be designed so that the evaporated gases exhausted from the safety valve 7 of each lithium cell 1 building up the battery stack 8 collect at the gas inflow port 40 of the gas processor 15. Further, the gas processor 15 needs to be designed in consideration of directions in which the case 16 is mounted (longitudinally-mounted or laterally-mounted).

Next is a description of behavior at the time of overvoltage and overcharge that are applied to the battery pack 10.

When the internal gases g have been discharged from the lithium cell 1, pressure of a space, acting as the battery cell housing 17, starts rising. The battery cell housing 17 and the gas inflow port 40 communicate with each other through the gas inflow port 40 and besides an inside of the gas processor 15 is under the atmospheric pressure. Hence, the internal gases g discharged inflow from the battery cell housing 17 to the gas processor 15 by the pressure difference therebetween. The internal gases g from the battery cell housing 17 inflow from the gas inflow port 40 to the flow path 51 of the gas processor 15 and first inflow to a first chamber 51a of the flow path 51 to come in contact with inner surfaces of the gas processor 15 and the cooling walls 53. The cooling walls 53, eventually the gas processor 15 made of metal are formed so as to have comparatively large thermal capacity and therefore are significantly low in temperature as compared to that of the internal gases g. Hence, when having come in contact with the inner surfaces of the gas processor 15 and cooling walls 53, the internal gases g are subjected to dew condensation to be liquefied, thus becoming liquefied gases 38. Then, when the internal gases g continue to inflow to the first chamber 51a, all the internal gases g cannot be liquefied only by inner surfaces of the first chamber 51a and the cooling walls 53 and therefore the internal gases g non-liquefied are forced to inflow from a communicating portion, being a discontinued portion of the cooling wall 53, to a second chamber 51b adjacent to the first chamber 51a. Then, when having come in contact with inner surfaces of the second chamber 51b and the cooling walls 53, the internal gases that have inflowed to the second chamber 51b are subjected to dew condensation to be liquefied. At this time, the second chamber 51b has been formed as the approximate triangle inside which the internal gases less come into collision with the inner surfaces as compared to the collision inside a quadrangular chamber. Hence, most of the internal gases g change into a rapidly-swirling current inside the second chamber 51b. Accordingly, the internal gases g are harder to outflow to a third chamber 51c and therefore are easier to perform heat-exchange with inner surfaces of the second chamber 51b. As a result, the internal gases g can be effectively liquefied inside the second chamber 51b. In addition, in order to improve further a liquefying effect of the cooling wall 53, an apical portion of the cooling wall 53 may be curved toward a side of the gas inflow port 40.

When the internal gases g from the lithium cells 1 further continue to be generated, all the internal gases g cannot be liquefied only by the inner surfaces of the first and second chambers 51a, 51b and the cooling walls 53. Hence, the internal gases g non-liquefied outflow to the adjacent third chamber 51c through the communicating portion, being the discontinued portion of the cooling wall 53. Then, when having come in contact with inner surfaces of the third chamber 51c and the cooling walls 53, the internal gases g that have inflowed into the third chamber 51c are subjected to dew concentration to be liquefied. Thus, if the internal gases g continue to be generated, the internal gases g continue to inflow from one chamber to another chamber such as from the first chamber 51a to the second chamber 52b and from the second chamber 52b to the third chamber 52c and so on in sequence. As a result, the internal gases g that have come in contact with inner surfaces of each of chambers 51 to 51f in this course are subjected to dew concentration to be liquefied in sequence. At this time, each of the chambers 51a to 51f is formed in the approximate triangle for the internal gases g to be easy to remain in each of the chambers 51a to 51f as described above and in addition a distance between each cooling wall 53 gets gradually narrower as coming closer to the communicating portion of each of the chambers 51a to 51f. Hence, a contact area between the liquefied gases 38 and each cooling wall 53 gets larger in the vicinity of the communicating portion and therefore the liquefied gases 38 are hard to pass through the communicating portion by their own surface tensions. In other word, the liquefied gases 38 are easy to remain in each of the chambers 51a to 51f and thereby the liquefied gases 38 can be prevented from leaking from each of the chamber 51a to 51f, eventually, from the gas processor 15. When the internal gases g are generated in high volume to be caused to remain non-liquefied even in having reached the final chamber 53f, the internal gases g non-liquefied get to the gas exhaust port 33 provided in the final chamber 53f to be exhausted outward.

As described above, the present invention has been explained based on each of the embodiments. The present invention, however, is not limited to each of the forging embodiments and can be variously modified within the scope of the gist of the present invention. For example, a secondary battery to which the present invention can be applied is not limited to the lithium-ion battery and the present invention is applicable to any batteries which discharges contained substances such as the internal gases or the like in overvoltage, overcharge or the like. Further, fins may be juxtaposed in the gas processor 15 to improve cooling performance in order to facilitate the gas liquefaction in the gas processor 15 and an air cooling method may be adopted by using a cooling fan. Furthermore, the gas processor 15 is provided at a rear side (an opposite position of the electrodes) of the battery cell housing 17 in the forgoing embodiments. However, relative position relationship between the gas processor 15 and the battery cell housing 17 can be appropriately varied to permit the present invention to be embodied.

Figure 1:
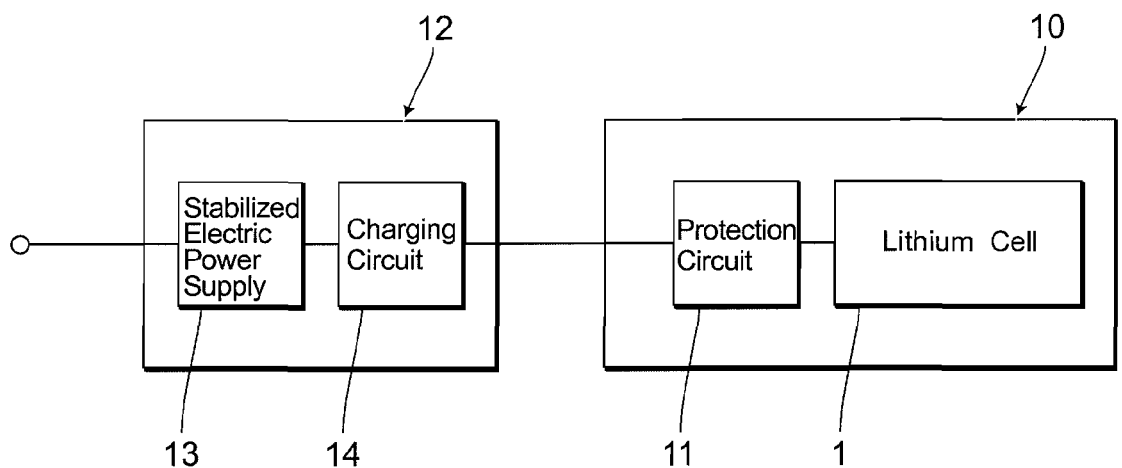
FIG. 1 is a block diagram illustrating a state where a battery pack is in use in a first embodiment of the present invention.
Figure 2:
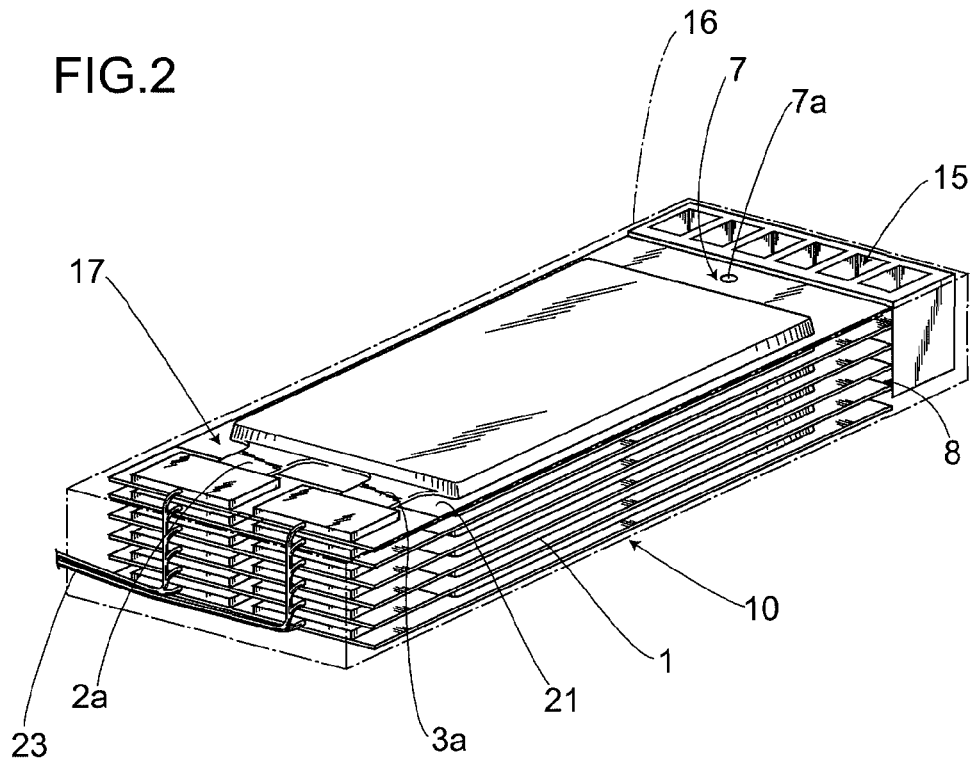
FIG. 2 is a perspective view illustrating an inside structure of the battery pack in the same.
Figure 3:
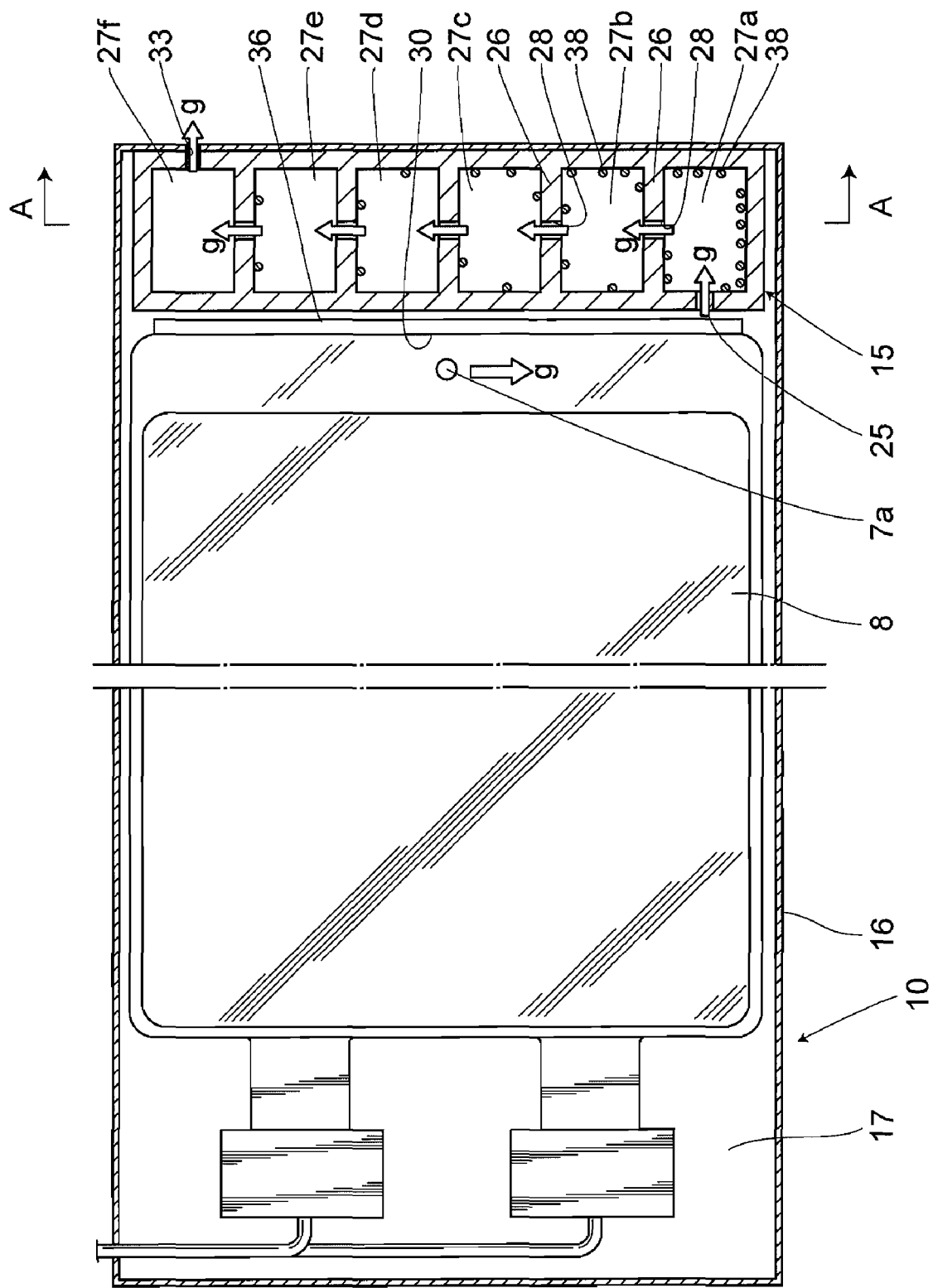
FIG. 3 is a plan cross-sectional in the same.
Figure 4:
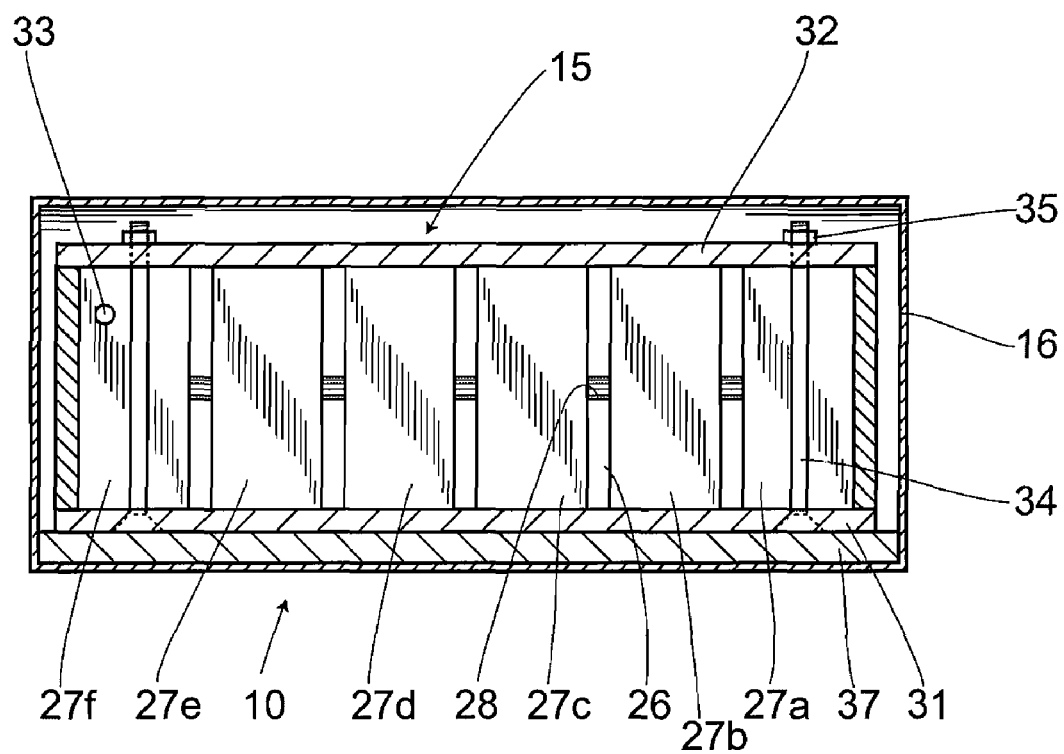
FIG. 4 is a cross-sectional view on arrow line A-A in the same.
Figure 5:
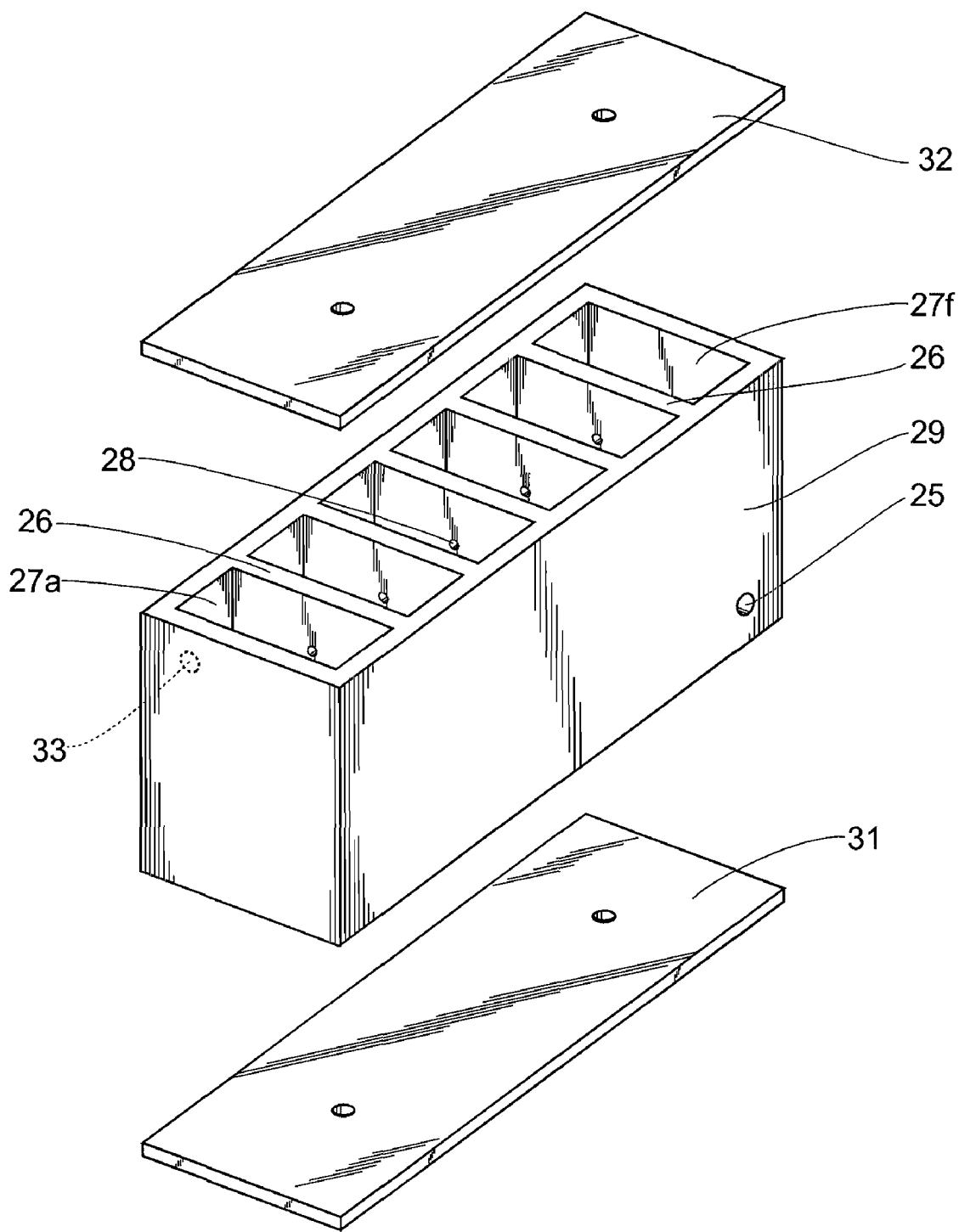
FIG. 5 is an exploded perspective view illustrating main members of a gas processor in the same.
Figure 6:
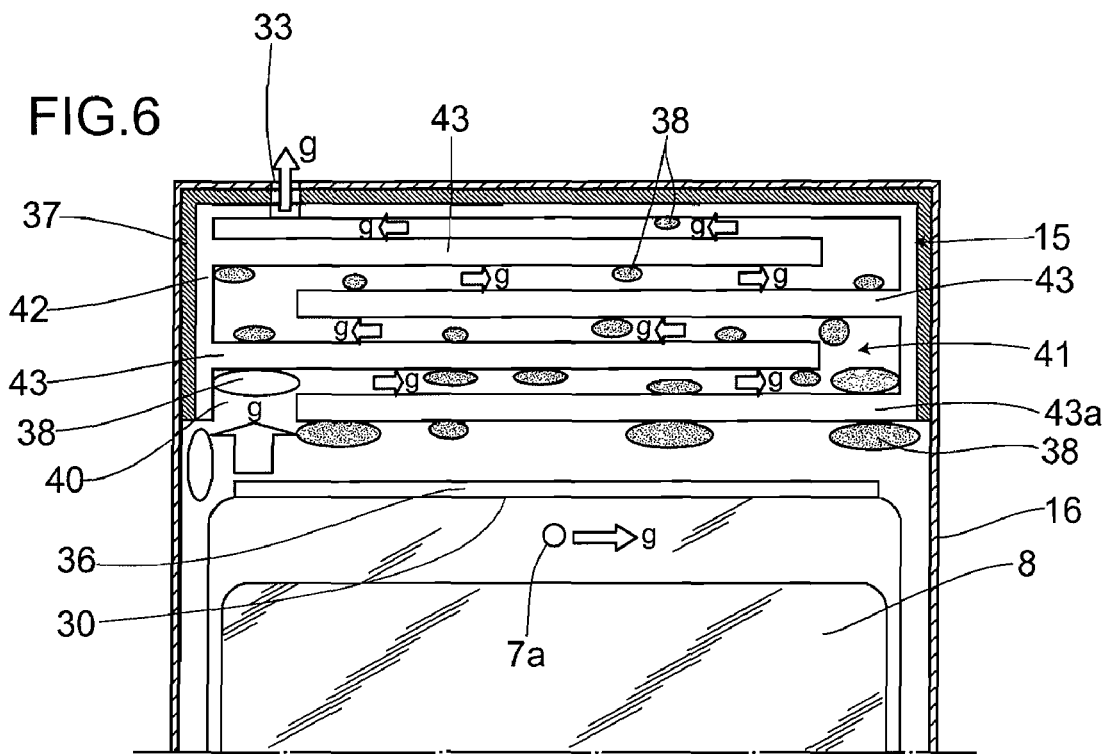
FIG. 6 is a plain cross-sectional view of a battery pack in a second embodiment of the present invention.
Figure 7:
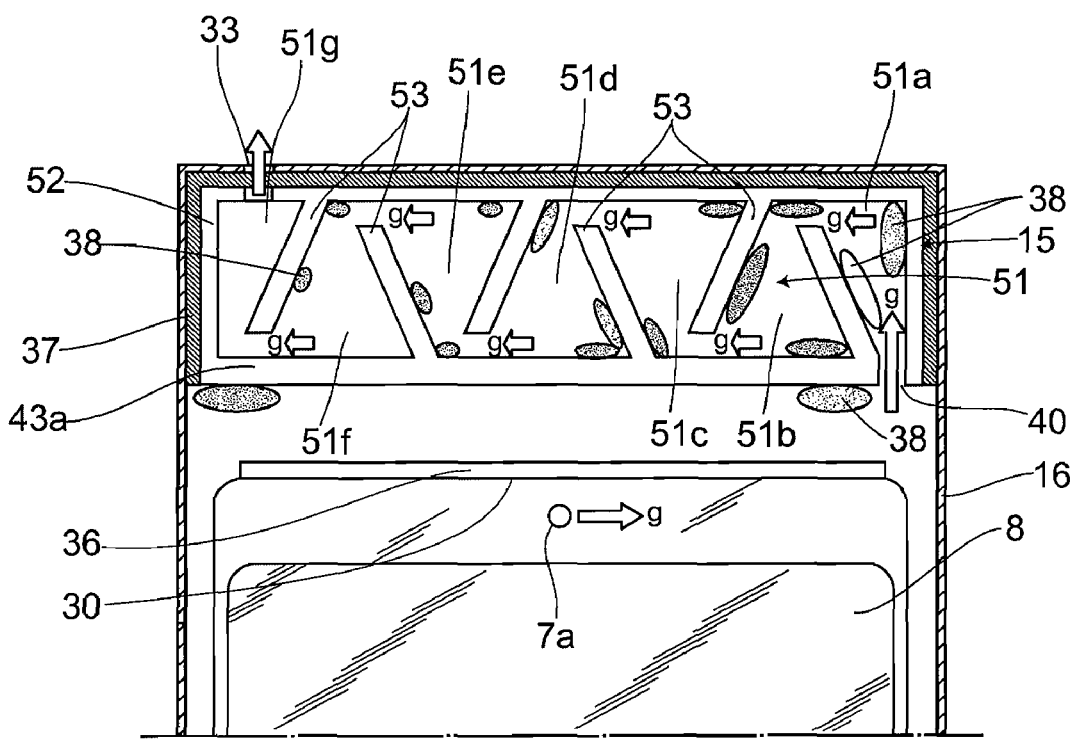
FIG. 7 is a plain cross-sectional view of a battery pack in a third embodiment of the present invention.
Figure 8:
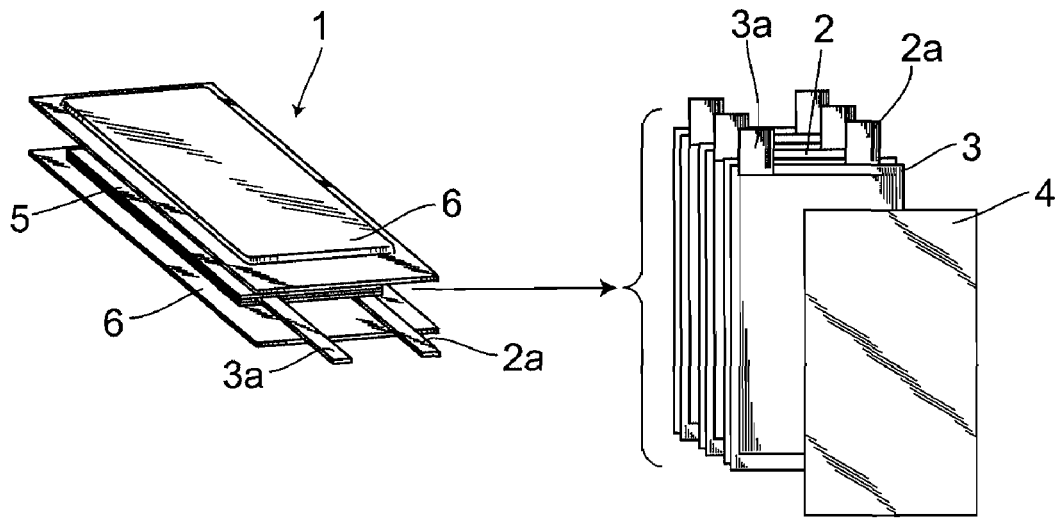
FIG. 8 is a perspective view illustrating a structure of a lithium cell.
Figure 9:
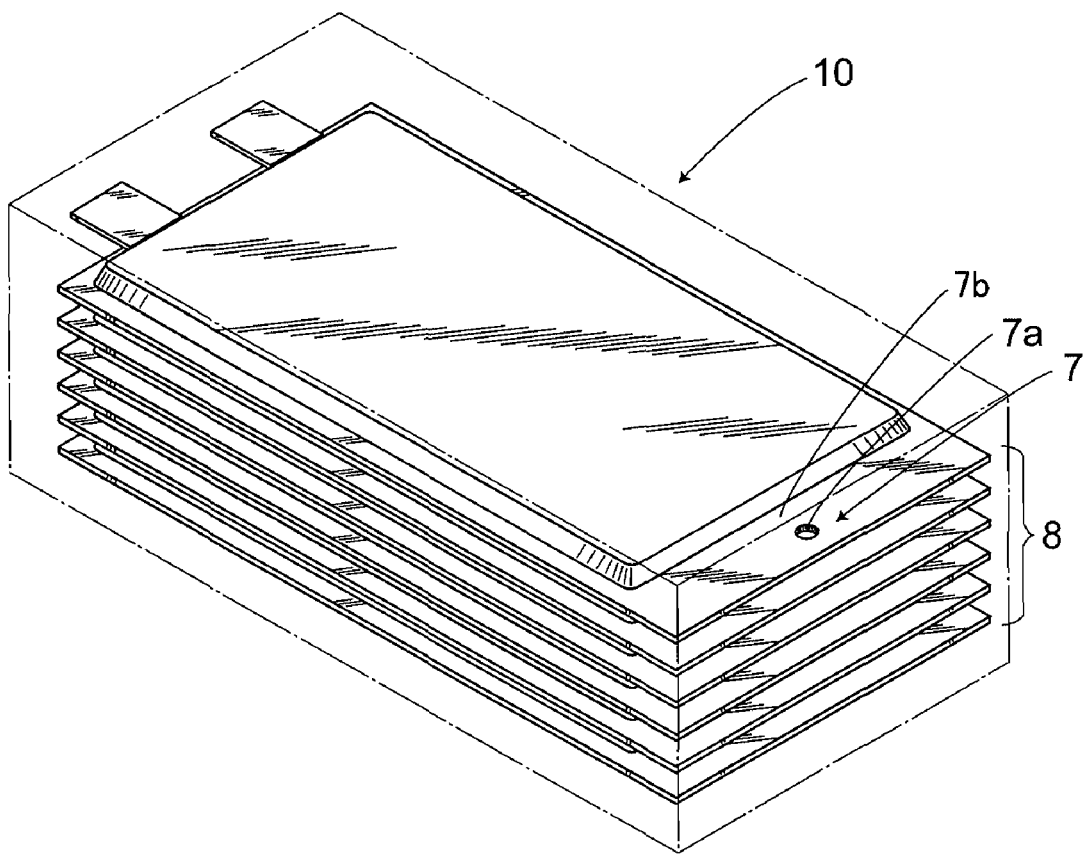
FIG. 9 is a perspective view illustrating a structure of the battery pack.

DESCRIPTION OF REFERENCE NUMERALS 1 lithium cell
8 battery stack
10 battery pack
15 gas processor (metallic body)
17 battery cell housing
25 gas inflow port
26 partition wall
28 ventilation hole
30 gas exhaust vicinity
33 gas exhaust port
36 liquid absorbent material
37 thermal insulating material
41, 51 flow paths
43, 43a, 53 cooling walls (partition walls)

The invention claimed is:
1. A battery pack comprising:
a case;
a battery cell housing which houses battery cells, and
a gas processor which liquefies gases generated from said battery cells, comprising:
 a metallic body including a plurality of spaces partitioned by partition walls and formed by making a metallic material into a boxy shape, said metallic material being excellent in thermal conductivity and in exoergic property;
 a gas inflow port provided in a space of said metallic body;
 a gas exhaust port provided in another space of said metallic body; and
 a ventilation hole provided in each of said partition walls,
wherein said gas inflow port is arranged over against said battery cell housing,
wherein said battery cell housing and said gas processor are provided inside said case,
wherein said gas processor is structured separately from said battery cell housing;
wherein said battery cells are lithium cells and are housed in said battery cell housing as a battery stack having a structure built up by stacking said battery cells one above the other, wherein said battery cells comprise a safety valve which discharges said gases to the outside of each battery cell when an internal pressure of each battery cell has become equal to or higher than a given pressure, and
wherein said gas processer is provided behind said safety valve.

2. The battery pack according to claim 1, wherein said gas inflow port is located at a position lower than where said ventilation hole is located.

3. The battery pack according to claim 1, further comprising a thermal insulating material arranged between said gas processor and said case of a battery pack.

4. The battery pack according to claim 1, further comprising a liquid absorbent material arranged in a gas exhaust vicinity of said battery stack against said gas inflow port.

* * * * *